Jan. 4, 1927.  1,612,797
R. W. BARKER
INSTRUMENT FOR MANIPULATING STRANDS OR YARNS
Filed August 13, 1920    7 Sheets-Sheet 1
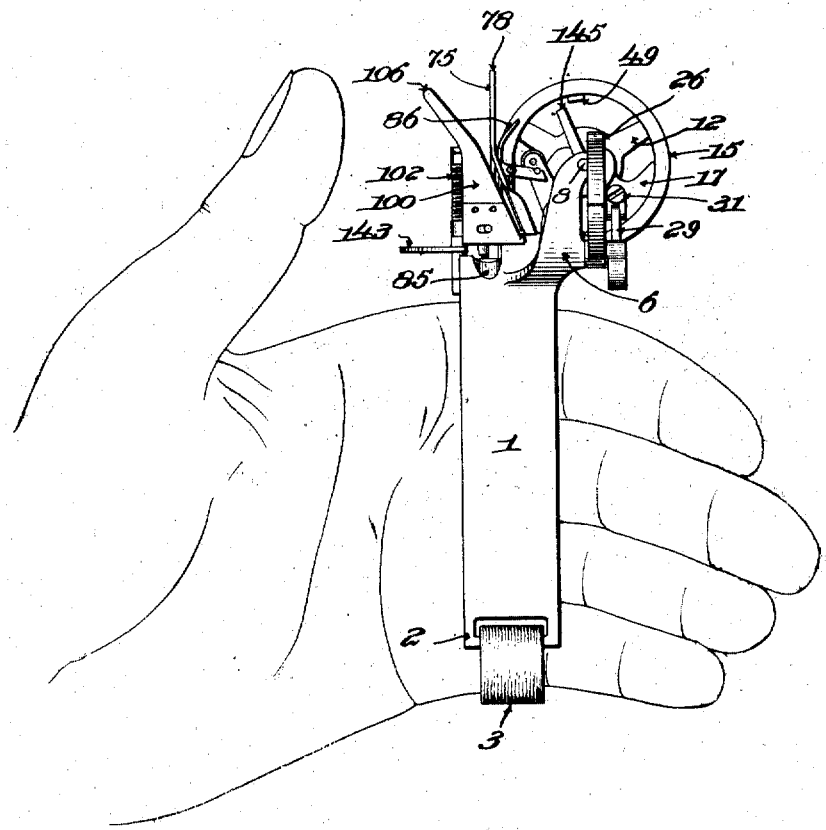
Inventor:
Robert W. Barker;
by Roberts, Roberts, Cushman
his Attys.

Jan. 4, 1927.　　　　　　　　　　　　　　　1,612,797
R. W. BARKER
INSTRUMENT FOR MANIPULATING STRANDS OR YARNS
Filed August 13, 1920　　7 Sheets-Sheet 2
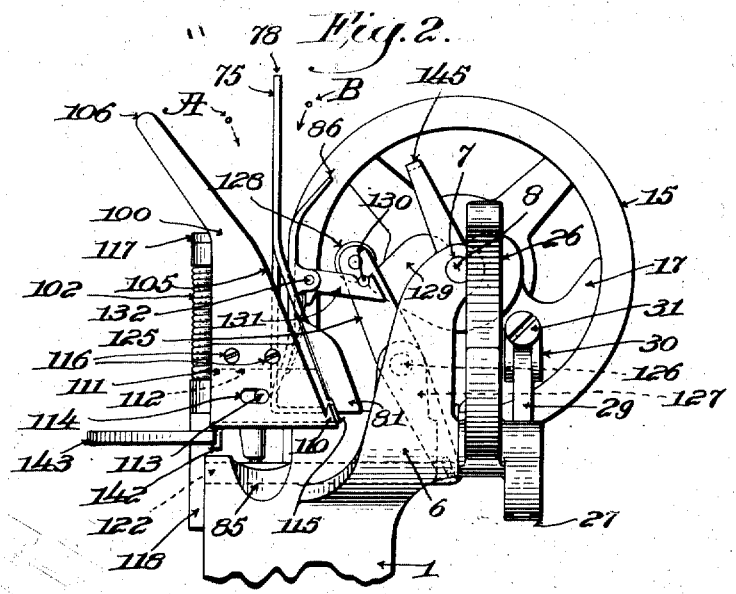
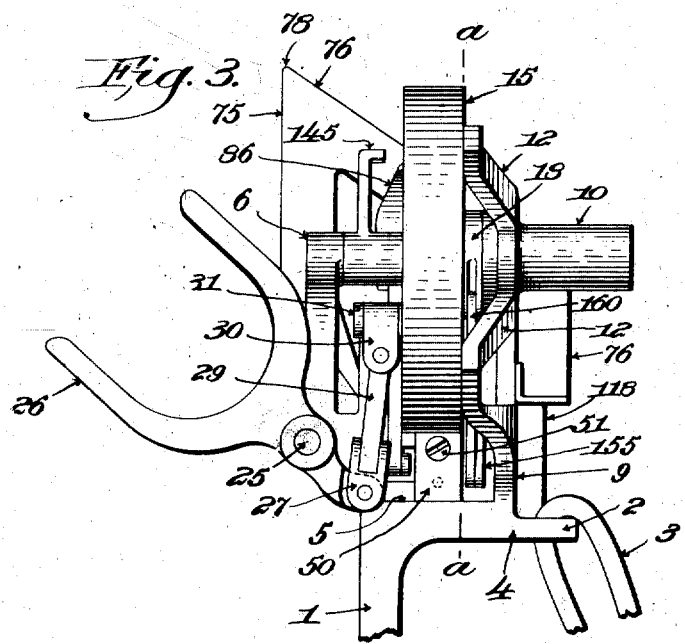
Inventor;
Robert W. Barker;
by Power, Roberts Cushman
his Attys

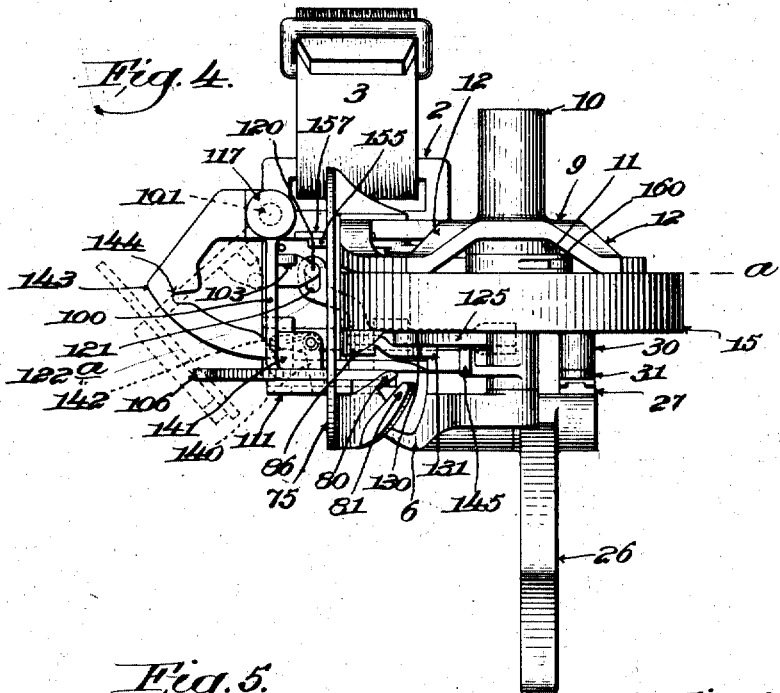

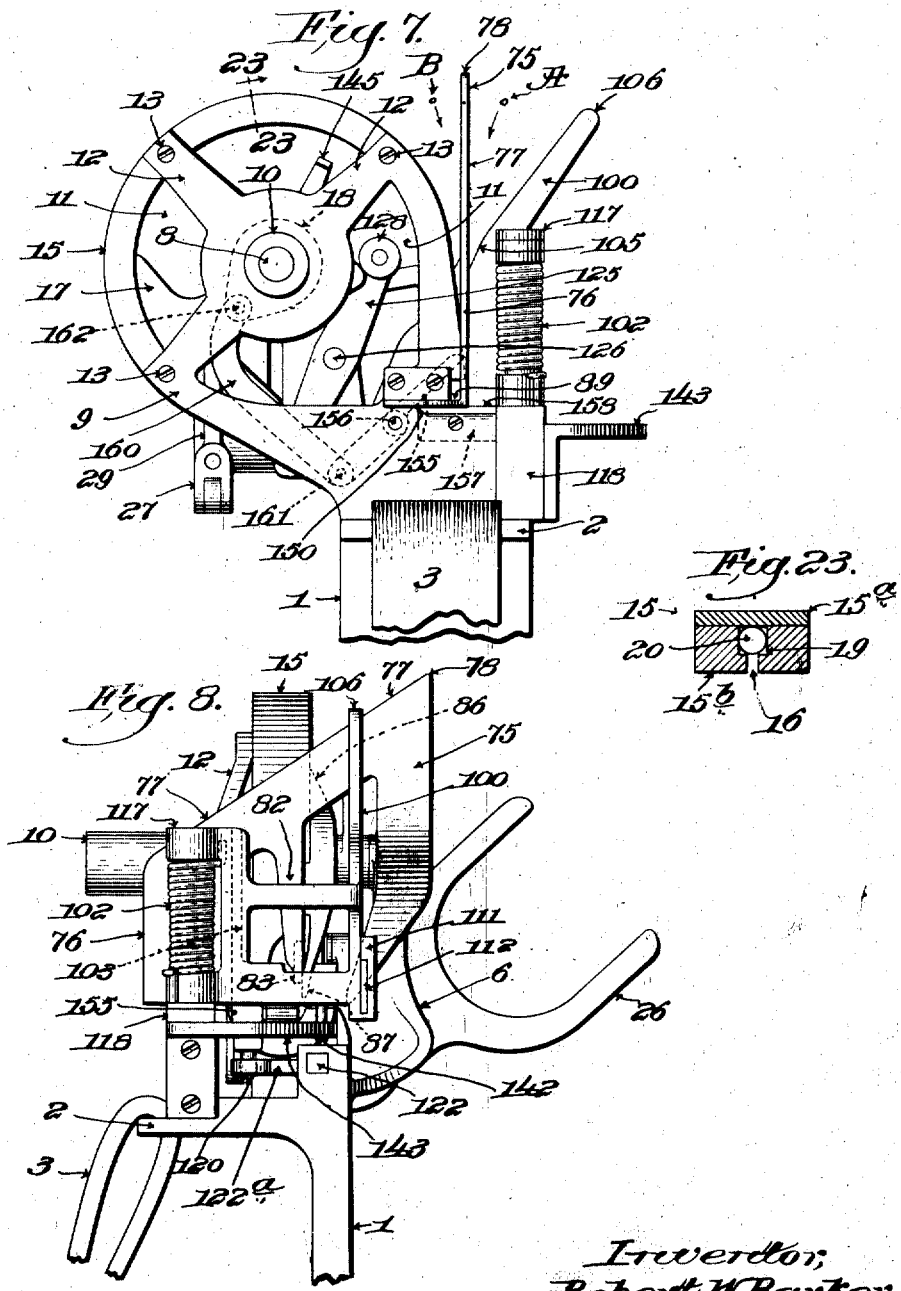

Jan. 4, 1927. 1,612,797
R. W. BARKER
INSTRUMENT FOR MANIPULATING STRANDS OR YARNS
Filed August 13, 1920  7 Sheets-Sheet 5
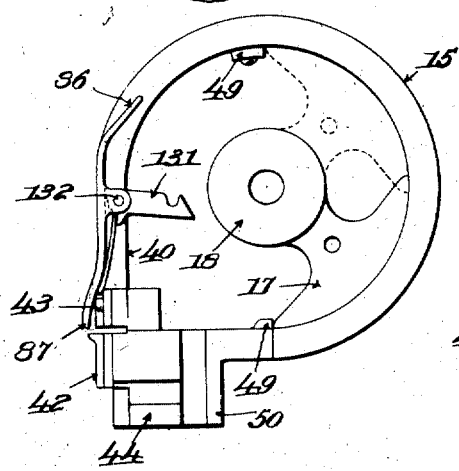
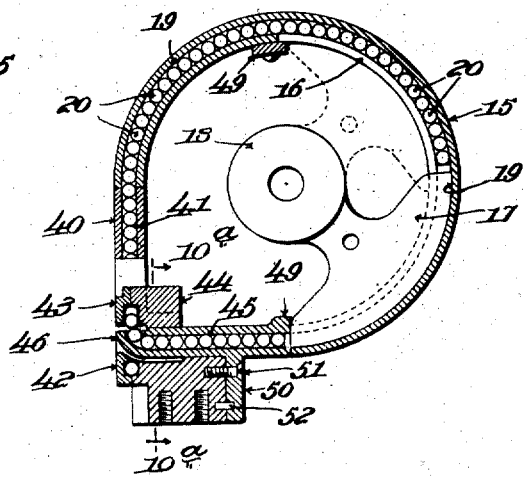
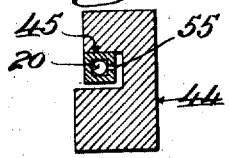
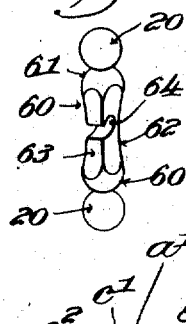
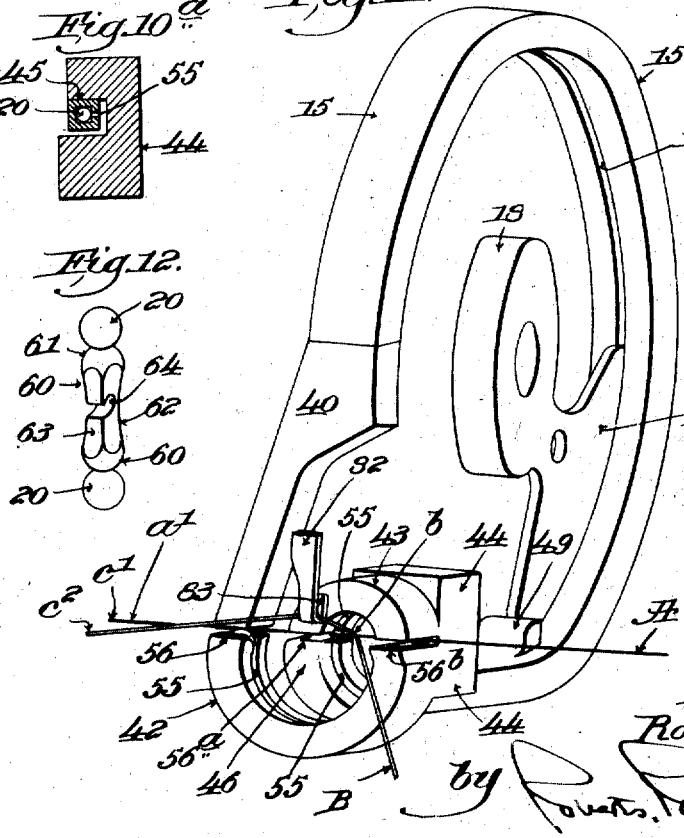
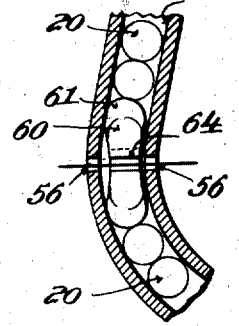
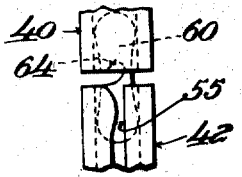
Inventor;
Robert W. Barker;
by Roberts, Roberts & Cushman
his Attys.

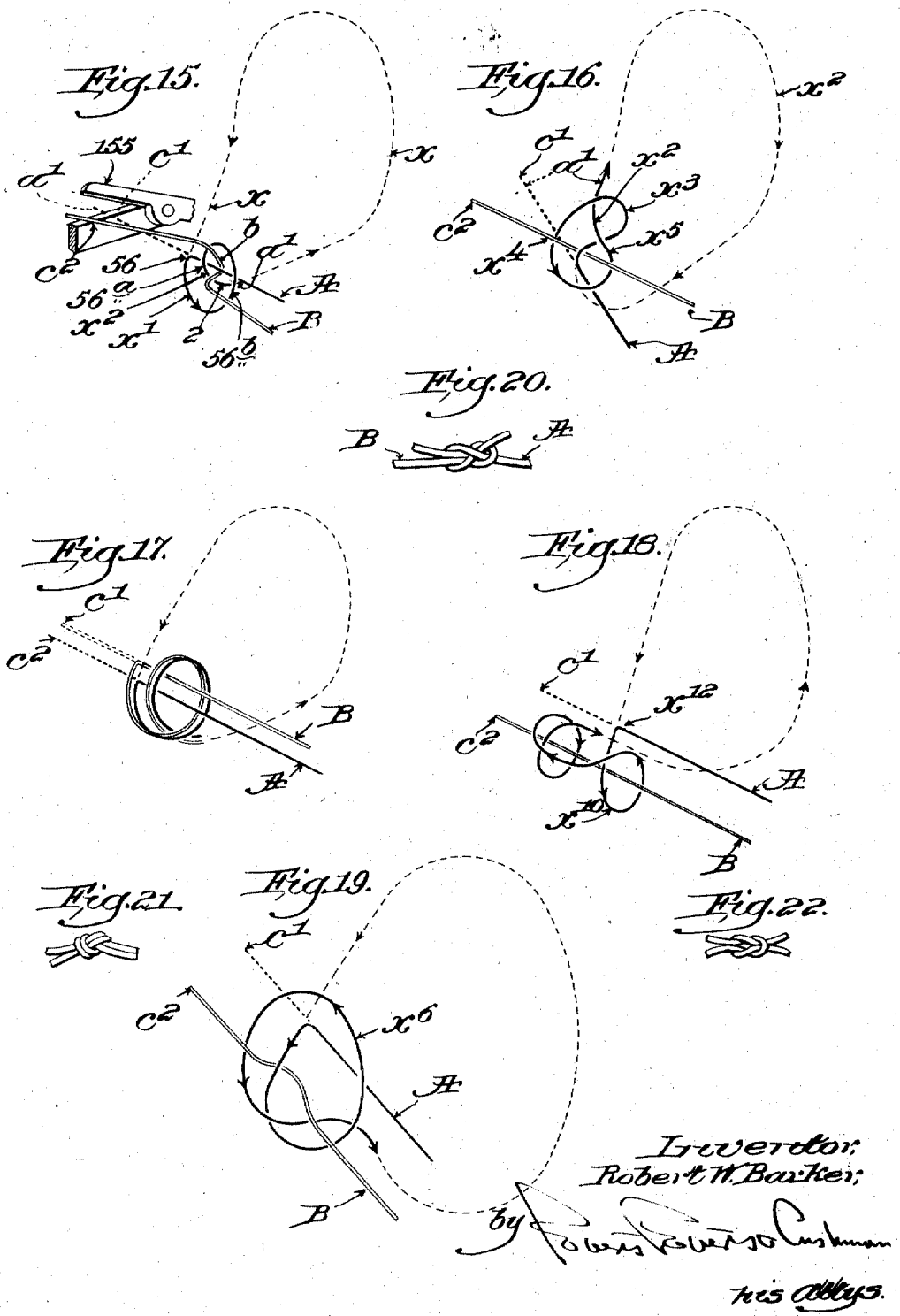

Jan. 4, 1927.  R. W. BARKER  1,612,797
INSTRUMENT FOR MANIPULATING STRANDS OR YARNS
Filed August 13, 1920   7 Sheets-Sheet 7
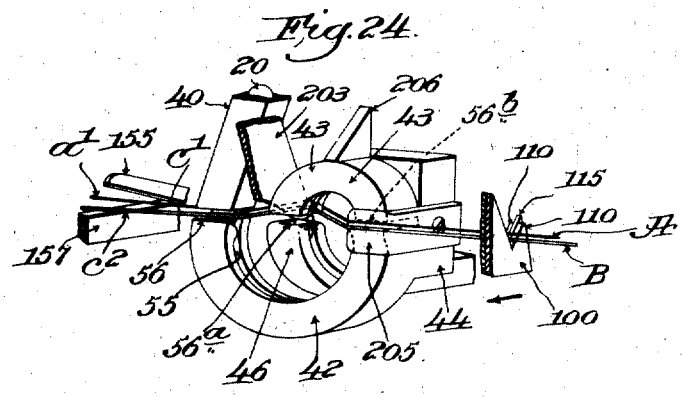
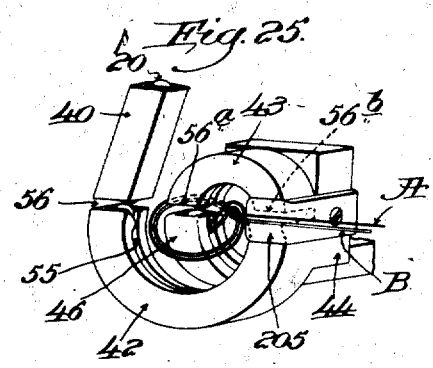
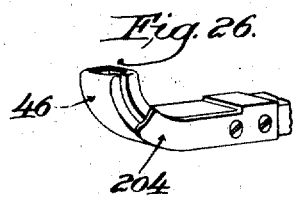
Inventor:
Robert W. Barker,
by
his Attys.

Patented Jan. 4, 1927.

1,612,797

UNITED STATES PATENT OFFICE.

ROBERT W. BARKER, OF PROVIDENCE, RHODE ISLAND, ASSIGNOR TO EDWARD A. TAFT, TRUSTEE, OF BROOKLINE, MASSACHUSETTS.

INSTRUMENT FOR MANIPULATING STRANDS OR YARNS.

Application filed August 13, 1920. Serial No. 403,255.

This invention relates to an art of and instrument for manipulating filaments, yarns or threads, for instance for the purpose of tying a knot, or for forming a component loop or bight of a knot. While the invention contemplates an instrument adapted for these purposes, it also relates to and will be explained in connection with further combinations, arrangements and adaptations constituting a hand implement for spoolers and other tenders of textile machinery, and adapted in this use for the rapid joining of yarn or thread ends by knotting them together. Specific instances shown in the drawings explain the construction and operation of the device for tying a weaver's knot, and other forms of knots useful to workers in textiles.

I am aware of ancient and numerous instances of the prior art of devices adapted to form yarns or threads into either a completed knot or the component loops and bights of a knot; such devices have been successively employed in netting machines for making fish and other nets, in book-sewing machines, in harvesters and grain binders, in knitting machines, and machines for tying-in or drawing-in warps; in warping machines, and for use as hand implements for winder or spooler, loom or spinning-machine attendants. It will therefore be understood that the invention is applicable to many different uses, for instance as an element of the above mentioned and other textile-cordage-using machines.

So far as I am aware the prior art has employed as an instrumentality for the direct handling and manipulation of the cordage (hereinafter referred to for convenience as yarn) instruments which may be characterized broadly as of two classes only, i. e., those comprising mutually movable grippers and tweezers and fixed or movable points by which the yarns are manipulated to form the bights of the thread formation sought to be made; and second, those comprising rotary tying bills and adjunctive mechanism such as static and movable guides and movable take-up or knot-setting means. Either type of device may employ means to sever the yarn acting coordinately with the formation of the knot or concatenation of yarns.

These instruments suffer serious disabilities inherent in their necessary construction. When it is attempted to form the loops and bights of a knot by separately movable instruments or grippers imitating the action of the human hands, the mechanism required to operate the yarn handling instrument proper is necessarily bulky and extraordinarily complex. Many arrangements of mechanism which will form interlocking bights or loops of two or more yarns can not be made operative to tie knots usefully because it is impossible to design the mechanism in such a way as to leave any free passage for taking the formed knot off or out of the instruments which acted to form it. This has been a limitation also applying to the ingenious rotary tying bill, which may be operated to form upon itself many theoretical arrangements of loops and bights corresponding to useful knots, but which in few instances is capable of being stripped of the formed knots. These instruments, however, have been employed of old and common knowledge for the formation of the seamstresses' or spooler's knot, with respect to which the adjunctive severing means, stripping means, and take-up means, as well as the mechanism for rotating the tying bill, can be reduced to practicable compass. But so far as I am aware, an instrument of this type has never been successfully employed with automatic preliminary yarn-presenting and knot-stripping means for the useful formation of other types of knots, e. g. weavers' knots, except as described and claimed in my copending application Serial No. 215,789, filed February 7, 1918.

A principal object of the present invention is to provide for forming knots in such a way that a genus of instruments free from the disabilities of the rotary tying-bill may be used, and to provide a yarn-manipulating instrument free from the disability of retaining upon itself the loops, bights or runs of useful yarn formations made by it, for whatever purpose. A further object is to combine and arrange an instrument of this character with adjuncts serving to position the yarns, to operate the instrument, to set up knots formed by the instrument, and to sever the ends desired to be severed in an improved manner. A further object is to provide a knot-tying instrument of the kind referred to capable of manufacture and use in such compass as to enable it to be employed as a hand instrument.

I shall explain the invention, with the aid of the accompanying drawing, in connection with mechanism specifically adapted to work upon two yarns to join them in the well known weaver's knot, and adapted as a matter of design and construction of the parts to be used as a hand implement attached to the hand of the user, and capable of tying perfect weaver's knots, including setting up the knot and severing the waste ends close to the knot in an improved manner.

In the accompanying drawings.

Fig. 1 is a front elevation of one species of the device as fastened on the operator's hand;

Fig. 2 is an enlarged detail elevation showing the mechanism proper, from the same point of view as Fig. 1;

Fig. 3 is an elevation viewed from the right hand side of Fig. 2;

Fig. 4 is a plan on the same scale as Fig. 2;

Fig. 5 is an elevation corresponding to Fig. 2 but showing the parts in a different position;

Fig. 6 is an elevation from the left hand side of Figs. 2, 4 and 5, parts being removed to illustrate internal features;

Fig. 7 is an elevation from the right hand side of Fig. 3;

Fig. 8 is an elevation from the left hand side of Fig. 2;

Fig. 9 is a detail elevation corresponding to Fig. 5, parts being removed;

Fig. 10 is a section on the irregular plane 10—10 of Fig. 6;

Fig. 10ᵃ is a detail section on the plane 10ᵃ—10ᵃ of Fig. 10;

Fig. 11 is a perspective stripped of adjunctive parts illustrating the yarn manipulating instrument proper and the relation to it of the yarns for practicing one method of tying a weaver's knot;

Fig. 12 a detail perspective illustrating the universally movable yarn carrier;

Fig. 13 is a vertical section showing the same part at its yarn receiving position;

Fig. 14 is a detail right side elevation of parts shown in Fig. 11;

Fig. 15 is a diagram perspective of the path taken by the carrier and the carrier driver in relation to the yarns for forming a weaver's knot by one series of steps;

Fig. 16 is a similar diagram illustrating the formation of a weaver's knot by motion of the carrier in another path;

Fig. 17 is a diagram illustrating the relation of the yarn to the path of the carrier for the formation in one way of a spooler's knot;

Fig. 18 illustrates the relation of the yarn to the path of the carrier for the formation of a square knot;

Fig. 19 illustrates by a similar diagram still another position of the yarns and path for the carrier for making a weaver's knot;

Figs. 20, 21 and 22 respectively illustrate the knots referred to as weaver's, spooler's and square knots;

Fig. 23 is an enlarged section on the line 23—23 of Fig. 7;

Fig. 24 is a perspective similar to Fig. 11 showing one way of using the device to tie a spooler's knot;

Fig. 25 illustrates a later stage of the operation of Fig. 24; and

Fig. 26 is a detail perspective showing a tension device optionally employed.

Referring now to Figs. 1 and 3, the working parts of the instrument may be erected on any suitable handle or frame 1, which may have eyes 2 for an attachment strap 3 adapted to pass back of the left hand. The handle 1 and its attachments supporting the moving parts will hereinafter be referred to as the frame.

The upper part of the frame extends at 4 toward the back of the hand and is there provided with an eye 2 for the upper end of the strap 3. The top of the frame 1 and the part 4 may be flat at 5 to provide a seat for the attachment of certain of the working parts. Opposite the extension 4 a curved bracket or integral lug 6 is provided at 7 with a bearing for one end of a short transverse shaft 8.

Referring now to Figs. 3 to 7, the frame 1 also includes an integral or attached vertical bracket 9 having a vertical face defining a plane $a, a$, Figs. 3 and 4, and having a tubular rearwardly extending bearing boss 10 for the preferably enlarged rear end of the shaft 8. The bracket 9 is preferably cupped rearwardly toward boss 10 and cut away as shown at 11 at all points unnecessary to the support of its attachments, leaving arms 12 bored at their extremities for attachment screws 13.

Concentric with shaft 8, bracket 9 supports a guide or raceway 15 for actuator means for a yarn carrier presently mentioned. Preferably at least 180° to 270° of the raceway 15 is concentric with the shaft 8; and is provided with an annular slot 16. Figs. 9, 10 and 11, for a carrier driver 17 comprising a segment fitting in the slot 16 and fast to a hub 18 bearing on the shaft 8. The circular parts of the raceway 15 may comprise two L-shaped members 15ᵃ and 15ᵇ, Fig. 23, attached together and defining between them a channel 19 for a contacting series of round steel balls 20 too large to fall out through the slots 16. With the exception of the space occupied by the segment 17 and a yarn carrier presently mentioned the series of balls 20 occupies the entire length of a curved channel connecting the ends of the circular part of the channel 19 including the circular part in raceway 15. Preferably the circular part of the raceway 15 and the channel 19 may as shown, be so long as to leave room for motion through about 180° of the circular part of the path of the balls 20 and of each face of the carrier driver sector 17, the extent of this motion being limited by stops 49, 49, for sector 17, one or both of which may be adjustable. Continuations of the channel 19 will presently be described, the whole constituting a guide for a yarn-carrier and its actuating means.

The actuator segment 17 may be operated by hand in any convenient manner. For instance, as best shown in Figs. 3 and 4, the bracket 6 may carry a short shaft 25 upon which a thumb lever 26 having at its inner end a shackle 27 is pivoted. Shackle 27 is connected by a link 29 to shackle 30 bearing on a shoulder screw 31 set in segment 17. A downward stroke of the thumb lever 26 therefore drives the segment 17 counter-clockwise as viewed in Figs. 5, 10 and 11. This motion is used for the primary actuation of all of the moving parts.

Integral with or attached to the hub 18 or the sector 17 cams or linkages presently mentioned, for instance severally controlling the timely operation of the yarn severing means and the yarn setting up and stripping means, complete the driving devices for the necessary adjuncts for forming the selected kind of knot.

Let it be supposed, as an instance only, that the yarn carrier is arranged to be driven in a path adapted to take the end of one of a pair of yarns in a convolute path in respect to another of the pair of yarns, such as to take this end beyond its passage through a bight of the other yarn around this bight and through the loop of the first yarn formed by the first part of its motion. This is the old familiar series of manipulations or hand method of forming a weaver's knot (Fig. 20) stated, see Fig. 15, in terms of the motion of yarn A about a bight $b$ formed in a yarn B. By the hand method the yarn B would have been laid upon the operator's thumb, the yarn A laid across it; the end of the yarn B brought back to form the bight similar to the bight $b$ of said figure and the end of the yarn A then moved in the direction of the arrow heads on so much of path $x$ as is shown in full lines.

The above described devices actuated by the thumb lever 26 can be arranged to carry out these ancient hand operations by the following expedients:

The channel 19 is diverted through a tangential extension 40 of the raceway 15 and inclined to the rear as best shown in Figs. 6 and 11. The extension 40 may be a separate piece of metal from the remainder of the raceway 15 having in it, see Fig. 10, a preferably rectangular channel 41 continuing the channel 19. The channel 19, 41 is further continued by a separate semi-circular raceway, see Fig. 6, preferably made as a milled channel of rectangular cross section in a two-part block 42 integral with or continuing the piece 40 as illustrated in Figs. 6, 11 and 14. The channel in block 42 is upwardly continued upon a curve of smaller radius but lying in the same plane by a channeled piece 43; the parts 42, 43, may be attached to or formed integral with a block 44 having squared faces one of which supports a tangential way 45 beginning at an inwardly curved portion 46 and ending at the lowest part of the circular raceway 15. Referring to Fig. 10, the way 45 has its left hand end 46 as shown in said figure in position to communicate with the left hand end of the curved channel 43 as shown in Fig. 11, the channel 45 curving sharply inwardly and toward the horizontal. The way 45 may be mounted in a channel or hole in the block 44 in any suitable manner; as shown this way is formed in a piece of metal having an integral depending lug 50 attached to the rear face of the block 44 by a screw 51 and having suitable dowel pins 52. The portion 46 as best shown in Fig. 11 is exteriorly free from contact with the adjacent parts of the curved channels 42, 43, and may have rounded corners to prevent chafing of yarn loops drawn into contact with it.

The channels 42, 43 are open on the inner faces of the curves which they define for the passage of a yarn end moving in the channel. One way of doing this is to provide a cut or saw gate 55, see Figs. 11, 14, and 10ª, entering the ball channel throughout the inner faces of the sections 42 and 43 of the raceway.

When the sector 17 stands against the lower stop 49 it will be evident that a particular point in the chain of balls 20 occupies a particular position at any given point of the raceway, and that motion of the sector 17 toward the upper stop 49 will cause this point in the chain of balls to traverse the convolution represented by the parts 40, 42, 43, and 46 of the way or guide for the balls.

I employ this motion, whatever the form of the convolution through which the chain of balls moves, to form the yarn into the convolutions of an unformed knot by carrying the end of the yarn in a path such as to lay the yarn in the bights and loops of these convolutions. The said path of the chain of balls is not necessarily, or even desirably, in itself of the form of the convolutions of the knot. The motion of the yarn-end traveling with the particular point in the chain of balls is motion laterally of a radiant or tangent free portion of the yarn extending from the loop or bight being laid at any time; the path of the seized and carried point in this yarn is thus related to the position being taken by the manipulated yarns as an evolute is to its involute; and it is preferred that no substantial part of the carried yarn be laid or finally positioned for the preliminary convolution of the knot in the actual path of the chain of balls. The convolution of yarn being laid is in the space within that part of the convolution of the chain of balls in which the yarn-end is at that time being carried.

For this purpose there is inserted in the chain of balls at an appropriate place a yarn carrier 60, of which a preferred form is illustrated in Figs. 12, 13 and 14, comprising a short section of a metal bar having a cross section conforming to and loosely fitting in the channels of the ball race or way, and having spherical or spheroidal ends 61 abutting against and adapted to be driven by and to drive, depending upon the direction of motion, the adjacent balls 20 of the series of balls. In order to accommodate the carrier 60 to the curves of the convolutions through which it is carried the intermediate faces of the rectangular solid constituting this carrier may be concave as shown at 62, 63, in every direction, the curvature of the concave being sufficient to enable passage of the carrier at the place of shortest radius in the convolutions through which it is driven. The carrier is made effective to receive and move a yarn end by the provision in it of a yarn receiving mouth or hook 64.

By reason of the angular cross section of the channels or ways in which the carrier 60 travels the opening of the mouth 64 will always face in the direction of the same face of the channel.

I have discovered that the mechanical transmission represented by the sector 17 and the series of balls including the carrier 60 working in a closed channel (that is, closed in the sense of being endless) is an instrument peculiarly effective for the purpose in mind. There is little back-lash or lost motion when such a chain of balls is sought to be reversed; the motion absorbs little power, is easy and positive, despite the necessary irregularities of the parts. But most importantly, the motion is transmitted to the carrier in such a manner that the transmission means may be parted anywhere for the passage by it of a yarn, the balls yielding through their small back-lash to permit passage through their series of the yarn at any desired point. The series of balls including the carrier and their driver means 17 may therefore be regarded as an instrument for convoluting a yarn in any desired series of loops or turns and possessing the unique advantage of adaptability to pass an enclosing bight or loop across itself at any point. In other words, any element of a knot or unformed knot, thread crossing, convolution, or cincture of yarns may not only be formed by such an instrument, but also entered upon and removed from it with complete disregard of limitation by reason of the position of the instrument itself in respect to affording permission for the passage by it of the enclosing loop or bight of yarn.

It will be observed that having provided a guide, conductor or way for the balls and the carrier interspersed in the series of balls, it is only necessary to provide for breakage across of the conductor or way at such points as it is desired to pass a yarn, a bight, a loop, or even a formed knot, through the driving connection represented by the balls. And when it is desired that the carrier should carry a yarn end, it is necessary only to open laterally (as at 55) the proper part of the way or channel to provide passage room for the trailing yarn end.

As shown in Fig. 11, for the purpose of making the particular knot selected for illustration, the ball channel or way is broken across at three places 56, $56^a$, and $56^b$, preferably lying in the same horizontal plane and thereby being adapted to admit passage of a straight run A of one of the yarns to be knotted together to cross the series of balls at three places.

The position of the stop 49 for the driver 17 is such as to bring the mouth 64 of the carrier 60 into coincidence with the gap or opening 56 when the carrier 17 is at the lower end of its stroke and when the thumb lever 26 is at the upper end of its stroke.

Suppose a yarn B to be laid in a diagonal position across the face of the convolution of the way at the parts 42, 43. If then the the tense run of yarn A is entered in the alined gaps $56^a$ and $56^b$, passing through the chain of balls in each of these gaps, the yarn B will be drawn inward through the plane of the curves 42 and 43.

The yarn A where it enters the cut 56 will be received in the mouth 64 of the carrier 62. Now let us first cut the yarn A at the point $c'$ and then swing the driver 17 upwardly. The cut end $a'$, will move in the direction of the arrow heads referring now to Fig. 15, through the portion $x'$ of the path $x$, passing to the right of the yarn B, passing round the bight $b$ of the yarn B, and passing downward through the loop of the yarn A formed by the downward motion of the trailing end of the yarn A and left in the space between the segment 42 of the ball race and the end 46 of the section 45, as shown in Fig. 15 at $x^2$. This completes the unformed knot, the end $a'$ of the yarn A pulling out of the carrier 60 on the continued passage of the carrier 60 through the portion 45 of its track or way. There is nothing to impede the removal of the formed knot, a tug on the yarn A removing the yarn formation so made from contact with the means for making it through the cut or passage 56ᵇ. In practice, the end of the yarn B may be cut at c², preferably after cutting the yarn A at c'. As indicated in diagram in Fig. 15, preferred steps in the operation comprise cutting the yarns A and B successively at c' and c²; this may be done by a single shear blade 155 first cutting one and then cutting the other.

I will now explain preferred adjunctive devices for positioning the yarns to be tied, for severing the yarn as an incident of tying, and for setting up and stripping the formed knot from the remaining devices, again referring for purposes of explanation only to the particular devices for forming a weaver's knot shown in the drawings and operating to tie the knot by the particular motion diagramed in Fig. 15. But it will be understood, as hereinafter explained, that the devices employed are in principle adapted to perform a similar duty in connection with operation of my improved implement for carrying one or more ends of yarn into the desired convolution of any type of knot.

Referring now to Figs. 1, 2, 4, 5, 7 and 8 particularly, suitable static and movable guides are provided for the primary positioning of a pair or more of yarns, such as the exhausting end and the preceding or fresh end of the winding and the unwinding yarn, which the operator has frequently to tie together. The drawings illustrate a preferred type of guides adapted to receive two yarns, or two groups of yarns, and to conduct them into the positions of the yarns A, B, illustrated in Figs. 11 and 15. In this preferred type, the strand-guiding devices may be regarded as species of the genus described in said application Serial No. 215,789, with suitable improvements adapting the devices to cooperate with the knot-forming means above mentioned and adapting the strand-guiding and knot-setting functions to be performed by the same parts.

In the preferred form shown, an upwardly projecting separator member 75 suitably attached to the bracket 9 defines at its rear side 76, Figs. 7, and 8, a vertical plane substantially parallel with axis 8. This separator member preferably has an upper inclined edge 77 extending forwardly to a point 78, and thence downwardly and inwardly toward the axis 8 (see Fig. 5) to a free bifurcated end 80, 81. The main body of the member 75 is centrally cut away, leaving a central tine 82 the lower end of which is turned up into a hook 83 facing the raceway 15. The position of this part is such that a yarn passing down the right-hand face of the member 75, as seen in Figs. 1 and 5, will come to rest in the hook 83 and be deflected to the right by the ends 80, 81, thence slip off the end 81 and pass to the left, in front of the block 44 and in front of the curve 42, finally reaching a position extending downwardly from the hook 83 into a depression 85 formed in the frame 1.

The passage of the yarn B in this direction is guided by the periphery of the channel 15 and by a guide 86, Figs. 2, 4, 5, 6, 8 and 9, ending in a point 87 in front of the hook 83 and in the plane of the tine 82. The guide 86, 87 and the surface 88 of frame 1 lift the yarn B away from the volute 43, and so prevent this yarn from entering the channel 56ᵇ.

Referring now to Fig. 7, the rear end of the run of the yarn B engaged in the instrument, bottoms in the angle of the guide 75, as shown at 89.

Referring to Figs. 1, 2 and 7, when the yarns A and B are put into the instrument the yarn A is guided in respect to the remainder of the device on the left-hand side of the member 75, which separates the yarns A and B. Cooperating with the member 76, and stationary while performing the function of guiding the yarn A, I provide guiding surfaces attached to or forming a part of a yarn take-up and knot-setting instrument 100, best shown in Figs. 2, 4, and 8. This instrument broadly comprises a lever pivoted on a vertical stud 101, lying parallel with the member 75 when closed, and under tendency to open from a spiral spring 102 coiled about the vertical stud 101. Projecting into the space between the takeup and guide 100 and the member 75 a vertical fin 103 serves to guide the yarn A out of contact with the spring 102. The forward end of the takeup 100 is turned inward toward the member 75 and extended upward to provide a slope 105 and a point 106, serving to guide the forward end of the yarn A against the left-hand surface of the tine 82 until the yarn A passes the tip of the hook 83 and the tip 87 of the guide 86. The tip 87 is closely adjacent to and near the channel 56ᵇ, see Fig. 5.

Slope 105 ends in hooks 110 best shown in Figs. 2 and 5, respectively formed in the piece of bent metal constituting the lever 100, and in a cap 111 having a channel in its inner face and attached at 116 to the lower part of the outer end of lever 100, and serving as a housing for clamp blade 112 having a movement therein limited by the end of a bell crank lever 140, mentioned below, working in a slot 114. The clamp blade 112 is provided with an inwardly rounded hook 115 conforming to the hooks 110 and adapted to clamp yarns entering the hooks 110 on motion of the blade 112 to the left of Figs. 2 and 5.

Preferably as shown, take-up, guide and clamp device 100 is a light stamping or forging cut away everywhere except at its guiding surfaces and where metal is needed for rigidity, and having bearings for the stud 101 of any suitable form. As shown, the stud 101 may be formed with a head 117, and be firmly seated in a lug 118 of frame 1.

The take-up lever and clamp are preferably operated as follows: Fin 103 is downwardly prolonged to provide a pivot-pin 120 taking into a slot 121 in arm 122$^a$ of a two-armed slide 122, see Figs. 4, 5 and 6, having a bearing in the lug 123 of the frame 1. The right-hand end of this slide is pivoted at 124 to a lever 125 pivoted at 126 to a lug 127 of the frame 1. The upper end of the lever 125 carries an anti-friction roll 128 in contact with a suitable cam 129 mounted on the shaft 8. Lever 125 is also provided with a pin 130 adapted to engage a notch in a latch 131 pivoted at 132 on channel 15. The latch 131 thus locks the lever 125 and slide 122 in position to hold the takeup lever 100 closed, as shown in full lines in Fig. 4 and in Fig. 2. This occurs when the thumb lever 26 is lifted prior to operation to the position of Fig. 3.

The clamp 112, 115, etc., is arranged to be operated as a consequence of release of the lever 100. Preferred means for operating the clamp comprise the bell-crank lever 140 pivoted on the under side of a lug 141 of the lever 100, said bell-crank lever having one arm engaged through a hole in blade 112, and one arm furnished with a depending pin 142 sweeping the surface of a cam sector 143, best shown in Fig. 4, which sector may be provided with a notch 144 to limit the outward sweep of the takeup arm, and be suitably attached to frame 1. A light spring about the pivot of lever 140 serves to keep the follower pin 142 on the cam 143.

The take-up arm is released at the proper time in the operation by a striker 145 fixed to the hub 18, and adapted to move the latch 131 near the end of the stroke of the thumb-lever 26.

The instrument is in condition to receive two yarns or groups of yarns A and B to tie them together in a weaver's knot when closed into the position shown in Figs. 1 and 2, the thumb lever being elevated as shown in levers 2, 3 and 4. In this condition a pair of yarns may be swept by the operator rapidly into the flaring passages between the point 106 and member 75, and the member 75 and the channel 15 respectively, the point 78 of the member 75 being adapted to enter between twisted yarns and separate them.

The yarn B sweeps to a final position from point 87, Fig. 7, to hook 83, to notch 85. The yarn A sweeps to the left of member 75 (to the right as shown in Fig. 7) and under the bent end of the member 75 to a point 150. Under stress of the slope 105, the yarn A now slips under the tip of the hook 83 and the tip 87 of the guide 86 and into the cut 56, 56$^a$, 56$^b$ in the convoluted ball race. At a point between the curve 42 and the hook 83 (see Fig. 11) the yarn A engages the yarn B and carries it inwardly in the bight $b$; see Fig. 15. In the lateral sense, the motion to the right of the yarn A in the cut 56 ceases upon engagement with the mouth 63 of the carrier 60, standing at this part of the ball-race. But at the cuts 56$^a$ and 56$^b$ the yarn A is free to sweep through the series of balls, and in doing so bends the yarn B as shown in the diagram, Fig. 15, and in Fig. 11.

I may arrange a tension device for the yarn A at and beneath the point 150, Fig. 7, but in practice the drag on the yarn is sufficient, the yarn A being the first to bottom in the hook 110, and therefore being pulled upon by the operator's right thumb and finger more than the yarn B.

The yarns A and B are now cut in the proper order of sequence by a single cutter operating coordinately with the motions of the carrier 60 to begin the convolutions of the knot.

Fig. 7 shows the cutter blade 155 in its open position, corresponding to the ready-for-operation position of the devices, in which the thumb-lever 26 is elevated and the take-up 100 closed. Blade 155 is pivoted on the inside face of bracket 9 at 156, and may be a shear blade cutting downwardly against a fixed ledger-blade 157 mounted on the inner face of bracket 9 with its upper sharpened edge near or in alignment with the surface 158 guiding the yarn A toward its point of rest 150. The point of rest 87 for yarn B is slightly above the edge of ledger blade 157 and to the right of the point 150 as seen in Fig. 7. Closing down of shear blade 155 will thus cut the yarn A first, and thereafter cut the yarn B.

The operation of blade 155 is arranged to take place in stages separated by a definite movement of the carrier 60, the severing of yarn A occurring during the first part of the motion of the carrier 60, as soon as it has engaged yarn A in its mouth 64, and the severing of yarn B occurring after the cincture or convolution of the knot is well forward, just before the knot is ready to be set up by sudden motion of the take-up 100. A convenient way of working the blade 155 is by a pitman 160 pivoted to the blade at 161 and to a crank-pin 162 on hub 18 fast on sector 17, and which may be integral with the cam 129 and driver 17. The yarn A is thus cut after being grasped by the carrier, but the yarn B is held from pulling out of position in respect to the motions of the end of yarn A until the end of yarn A has made the motions indicated in Fig. 15. The cut end of yarn A trails behind the carrier 60 through the curve 42, the held end passing through the slot 55. When the carrier 60 reaches the part 46 of the ball race, the yarn B is severed and the takeup released.

This first clamps the yarn A in the clamp 110, 112, and then pulls the formed knot out of all engagement with the mechanism, the end $a'$ of yarn A pulling out of the end of channel 46 with enough tension firmly to set up the knot, which is formed in the free central space between the curves 42, 43.

Referring now to Fig. 16, the weaver's knot shown in Fig. 20 may also be made by other convolutions of the convoluting instrument explained in connection with the machine figures. With appropriate changes in the direction of the bent channels, the yarns A and B may be laid across each other, for instance as shown in Fig. 16, and the carrier 60 be arranged to travel in the path $x^2$, but now in the opposite direction as indicated by the arrow-heads in the figure. The yarn A having been severed at $c'$, the end $a'$ may be carried inwardly and upwardly to form the loop $x^3$, downwardly and outwardly between the yarns A and B at $x^4$, and thence inwardly and upwardly around the yarn B at $x^5$, and through the loop $x^3$, as shown. As before, a tug on the end of the yarn A will now set up a weaver's knot.

A somewhat different series of motions for tying a weaver's knot is shown in Fig. 19, the tying motion being downward, the carrier 60 taking the end of the yarn A in the path $x^6$, as shown in the figure.

Other arrangements still of the convolutions producing this knot will occur to the skilled artisan as corresponding to any of the many different ways in which one yarn may be carried around another yarn and itself to form a weaver's knot.

The mechanism explained in connection with Figs. 1 to 15 may also be employed, with minor changes only, to tie a spooler's knot.

Referring now to Fig. 24, the fin 103, Fig. 4, may be replaced by a fin 203 adapted to enter between the channel 40 and the volute 43, substantially as shown in said figure, and the stop 205 may be arranged to cover the cut $56^b$. A sloped guide 206 is also preferably mounted on top of the volute 43. The separator 75 may be discarded.

The yarns A and B are now entered together between the slope 203 and the periphery of the channel 15, whereupon both yarns are guided into the cut 56 and the carrier 60, and through the contacting balls at cut $56^a$ by the operation of the guide 203, being prevented from catching on top of the volute 43 by the guide 206, and being held forward in front of volute 42, 43 by the stop 205. On operating the carrier, the spooler's knot is formed in the manner illustrated in Fig. 25, is set up by motion of the lever 100 in the direction of the arrows in Fig. 24 and Fig. 25, and the cut ends, severed by the shear blade 155, are withdrawn from the channel-piece 46 by the motion of the take-up 100.

The motion made by the yarn, for comparison with the other figures, are diagrammed in Fig. 17.

When a heavy or stiff yarn is being tied in this manner, I prefer to add to the channel-piece 46 a tension-spring 204 adapted to hold the trailing cut ends with considerable force.

Referring now to Fig. 18, a diagram similar to the other figures is therein shown, explaining the formation of the square knot, Fig. 22, by motions of the cut end of the yarn A about the standing end of yarn B. The adaptation of the mechanism shown for this purpose will be apparent to those skilled in the art; the carrier is made to follow the convolution $x^{10}$, receiving the cut end of the yarn A at $x^{12}$, the knot being set and stripped as before.

It will now be apparent that the instrument described is capable of adaptation to the formation and completion of knots in the many different ways indicated, and that I have not only provided a hand-knotter adapted to tie weavers' knots, but also have provided for that specific use an instrument flexibly adapted to a great many other cognate purposes, and working on a principle new to the manipulation of cordage.

In the claims reference is made to filamentous materials such as strips, single fibers, or bundles of fibers, wires, cordage, thread and yarns indiscriminately as "yarns" or "strands", without intent to delimit thereby any particular class of such materials in respect to which the method may be practiced or upon which the mechanism claimed may operate.

When in the claims I refer to motions in complex curves or curves of three-dimensional characteristics, I am to be understood in the ordinary mathematical significance of these words as referring to curves not wholly in two-dimensional space, such as a single plane, but having extent in a third dimension as well.

I claim:

1. Knot-tying strand-manipulating means comprising a movable strand-engaging carrier, and means for directing the carrier in a complexly curved path having elements lying in three dimensions.

2. Strand-manipulating means comprising a movable strand-engaging carrier, and disjunct means for directing the carrier in a complexly curved path.

3. Strand-manipulating means having therein a movable strand-engaging carrier, and means for moving the carrier in a convoluted path related to and different from a convolution formed by said strand as a result of said motion.

4. Strand-manipulating means having therein a movable strand-engaging carrier, means for guiding the carrier for motion in a curved path in three dimensions, and means for driving the carrier in said path.

5. Strand-manipulating means having therein a movable strand-engaging carrier, means for guiding the carrier for motion in a curved path in three dimensions, and means disjunct from the carrier for driving the carrier in said path.

6. In a strand-manipulating device, a guide adapted to conduct a carrier in a path different from and related to the convolutions of one strand in a knot, a carrier adapted to follow the guide to lay the strand in said convolutions, and means for driving the carrier.

7. Strand-manipulating means comprising a strand-end carrier, means for confining the motion of the carrier in a predetermined path, and discontinuous means for driving the carrier.

8. Yarn-manipulating means comprising a yarn-end carrier and driving-means for the carrier adapted to move it in a convoluted path, in combination with means for guiding a yarn or yarns in relation to said path.

9. Yarn-manipulating means comprising a yarn-end carrier and driving-means for the carrier adapted to move it in a convoluted path, in combination with means for guiding a yarn or yarns in position to be seized by the carrier.

10. Yarn-manipulating means comprising a yarn-end carrier and driving-means for the carrier adapted to move it in a convoluted path, and means for guiding a yarn or yarns in position to be encircled by one or more spires or volutes of the motion of the carrier.

11. A knotter having therein guides for a yarn or yarns to be knotted, a non-rotative instrument for causing motion of a portion of one or more of the yarns in a path causing another portion of the yarn or yarns to be laid in the convolutions of a formed knot, and operating means for the instrument.

12. A knotter having therein guides for a yarn or yarns to be knotted, a non-rotative instrument for causing motion of a portion of one or more of the yarns into the convolutions of a formed knot, severing means for freeing an end of one or more of the yarns for carriage thereby, and operating means for the instrument.

13. A knotter having therein guides for a yarn or yarns to be knotted, a non-rotative instrument for causing motion of a portion of one or more of the yarns into the convolutions of a formed knot, severing means for freeing an end of one or more of the yarns for carriage thereby, take-up means for setting up the formed knot, and operating means for the instrument.

14. The combination with means for guiding a plurality of yarns, a carrier for one or more of these yarns, and actuating means for moving the carrier adapted to afford passage for the yarn through the actuating means, the carrier being moved in a path causing the yarn to be laid in the convolutions of a knot.

15. The combination of yarn-guiding means with yarn seizing and manipulating means comprising a carrier movable in three dimensions, and means discontinuously contacting with the carrier for moving it.

16. The combination of a carrier for a yarn movable in the convolutions of a knot with actuating means for the carrier adapted to be separated to afford passage for the yarn through the actuating means.

17. The combination of a carrier for a yarn movable in the convolutions of a knot with actuating means for the carrier separable to afford passage for the yarn at a plurality of places through the actuating means.

18. The combination of yarn-guiding means severally for a plurality of yarns with yarn-seizing and manipulating means comprising a carrier adapted to move one of the yarns in three dimensions, and means discontinuously contacting with the carrier for moving it to carry its yarn about the other yarn in the convolutions of a knot.

19. A strand-manipulating instrument having therein a strand carrier, a guide for the carrier having a convolution adapted to direct the carrier, a guide or guides for a passive strand related to the guide for the carrier, and means directed by the guide for driving the carrier along the convolution whereby to form the convolution of a knot by a carried strand in relation to a passive strand.

20. A strand-manipulating instrument having therein a strand carrier, a guide for the carrier having a convolution adapted to direct the carrier, and a series of discrete driving members contacting along and directed by the guide for driving the carrier along the convolution.

21. A strand-manipulating instrument having therein a strand carrier, a guide for the carrier having a convolution adapted to direct the carrier and a plane portion, and means directed by the guide for driving the carrier along the convolution and an actuator working at the plane portion of the guide for said driving means.

22. A strand-manipulating instrument having therein a strand carrier, a guide for the carrier having a convolution adapted to direct the carrier and a plane portion, and disjunct means directed by the guide for driving the carrier along the convolution and an actuator working at the plane portion of the guide for said driving means.

23. A strand-manipulating device having therein, in combination, a movable carrier, and means for actuating said carrier, said means having portions in contact with said carrier disjunct to permit the passage of a strand transversely thereacross.

24. In a strand manipulating device, in combination, a strand carrier, a plurality of independently movable elements arranged in series, the contiguous portions of adjacent elements being substantially in contact and the endmost elements of said series contacting respectively with opposed portions of said carrier, and means for guiding and imparting improvement to said elements.

25. In a device for operating upon a filamentous strand, in combination, a strand engaging member, and means for moving said member in a predetermined path, said means comprising a series of normally contacting balls.

26. In a device of the class described, in combination, a strand carrier, means for guiding said carrier, a movable driver, and a series of normally contacting balls, the endmost balls of said series contacting respectively with said carrier and said driver.

27. A strand-manipulating mechanism having therein a strand engaging element, a movable driver, and series of normally contacting independent bodies interposed between said driver and the respective ends of said strand engaging element, for transmitting motion from said driver to said element.

28. In a device of the class described, in combination, a yarn carrier, a driver member, and series of balls interposed between the adjacent ends of said carrier and driver member respectively, whereby movement of said driver in either direction serves to positively actuate said carrier.

29. A yarn manipulating device having therein a yarn engaging instrumentality, and means for moving it, in combination with guide means for predetermining a path of movement for said instrumentality, said means having gaps therein permitting passage of a yarn transversely of said path.

30. A yarn manipulating instrument having therein a channeled guide, a carrier moving in and guided by the channel, a contacting series of discrete driving members movable along the guide to operate the carrier, and means for moving the series of driving members and the carrier.

31. A yarn manipulating instrument having therein a channeled guide having a portion extending in two dimensions only, a carrier moving in and guided by the channel, a contacting series of discrete driving members movable along the guide to operate the carrier, and means for moving the series of driving members and the carrier operating at a two-dimensional portion of the channel.

32. A yarn manipulating instrument having therein a channeled guide convoluted in one portion of its length and lying in a plane at another portion of its length, a carrier moving in and guided by the channel, a contacting series of discrete driving members movable along the guide to operate the carrier, and means for moving the series of driving members and the carrier operating at a two-dimensional portion of the channel.

33. A yarn-manipulating instrument having therein a guide one portion thereof constituting an arc of a plane circular curve and another portion thereof forming a spiral of three dimensions, a carrier adapted to carry one end of a strand extending transversely of said guide and movable along said spiral portion, and a driver member for the carrier movable along said circular portion.

34. A yarn-manipulating instrument having therein, in combination, a guide, one portion of said guide constituting an arc of a plane curve and another portion of said guide forming a curve of three dimensions, a carrier slidable along that portion of said curve which is of three dimensions, an actuator for said carrier movable along said plane curved portion, and means for transmitting movement from said actuator to said carrier.

35. A yarn-manipulating instrument having therein, in combination, a guide, one portion of said guide constituting an arc of a plane curve and another portion of said guide forming a curve of three dimensions, a carrier slidable along that portion of said curve which is of three dimensions, an actuator for said carrier movable along said plane curved portion, and disjunct means for transmitting movement from said actuator to said carrier.

36. A yarn manipulating instrument having therein in combination a guide having an endless channel therein, a carrier slidable in said channel and having a yarn engaging element, series of balls located in said channel at either side of said carrier, and means for moving one of said series of balls along said channel whereby to push said carrier longitudinally thereof.

37. In a knotter, a strand manipulating carrier movable in a path of three dimensions, an actuator for said carrier movable in the arc of a plane curve and means adapted to pass a strand transversely moved in respect to said means interposed between said carrier and its actuator whereby movement of the latter is transmitted positively to said carrier.

38. A device of the class described comprising in combination a guide, said guide longitudinally discontinuous, and thereby adapted to be intersected by a strand having a portion thereof arranged in the arc of a plane circular curve and having another portion thereof spirally arranged, a pivoted actuator sector oscillatable along said circular arc, a carrier movable along said spiral portion of the guide, and means adapted to pass a strand laterally for transmitting movement from said sector to said carrier.

39. Yarn manipulating mechanism having therein a guide member having a longitudinal channel therein and a longitudinal slot opening into said channel, an actuator device extending through said slot and having a head located within said channel, a carrier adapted to receive and carry a transversely-extending strand movable along said channel, and means located within said channel for operatively connecting said head and said carrier.

40. A yarn manipulating mechanism having therein a yarn engaging implement or carrier, a guide for said carrier along which said carrier may be moved, said carrier and said guide being constructed and arranged substantially to prevent turning of said carrier about the axis of its path of movement.

41. Yarn manipulating mechanism having therein a convoluted guide, and a carrier for the yarn, the carrier being slidable on the guide, said parts having interengaging surfaces adapted to prevent rotation of the carrier in respect to the guide, and means for sliding the guide.

42. In a device of the class described, a yarn carrier, a guide providing a longitudinal channel for the reception of said carrier, and means for moving said carrier along said channel, said carrier and channel having interengaging parts constructed and arranged to prevent rotation of said carrier about the axis of its path of movement.

43. Yarn manipulating mechanism having therein a substantially rectangular block providing a yarn engaging instrumentality, a guide having a rectangular channel for said block, and means for moving said block longitudinally of said channel.

44. A device for manipulating yarns having therein a curved guide having a portion of its length spirally disposed, certain convolutions of said spiral portion being intersected by aligned gaps or slots, and a carrier slidable along said guide and across said slots adapted to receive and carry a yarn entered in one or more of said slots.

45. A device for acting on strands, having therein a guide providing a curved pathway, passages for strands intersecting portions of said pathway, and a strand manipulating instrumentality movable along said pathway and across said strands.

46. In a device of the class described in combination a guide, said guide having a gap extending transversely across the same, and a carrier movable along said guide and having means for engaging a strand in said gap, said carrier being of a length greater than the width of said gap.

47. In combination in a device of the class described, means providing an elongated guide channel, said channel being intersected by a transverse gap or slot, a carrier freely slidable in said channel and having a strand engaging means thereon, and means for moving said carrier along said channel and across said gap.

48. In a device of the class described, in combination, means providing a curved guide channel, a strand carrier slidable within said channel, said carrier comprising an elongated block having concave longitudinal faces, and means for moving said block along said channel.

49. In a device of the class described, in combination, guide means and a strand carrier movable therealong, said carrier comprising a block of generally rectangular form having opposed longitudinal concave faces, and convex end surfaces.

50. A strand carrier for use in strand manipulating mechanism, comprising a polygonal elongated block having a transverse slot intermediate its ends, opposite longitudinal faces of said block being concave, the ends of said block being rounded.

51. A knotter having therein yarn-guides and a yarn end engaging element, and means constructed and arranged for bodily moving said element in a path of three dimensions.

52. A knotter characterized by a carrier for moving a component yarn in a complex path, and having therein, in combination with the carrier, a guide for directing the carrier broken through for passage of the bights or loops of the formed knot.

53. A knotter having therein yarn-guides and a carrier having means for engaging a yarn substantially at an end thereof, and means for bodily moving said carrier in a curved path comprising a reentrant loop.

54. A knotter having therein means for tying yarns together comprising a yarn-end carrier adapted to be driven in a convolute path corresponding to the convolutions appropriate to the position of one yarn in respect to the other, means for guiding the other yarn in position to be involved in the convolutions, and means for severing the leading end of the carried yarn.

55. A knotter having therein in combination, nonrotative convolution-forming means including a carrier for a yarn-end, means for placing a free end of yarn in the carrier, and means for guiding another yarn in position to be involved in convolutions of the yarn formed upon operation of the carrier, and means for moving the carrier in a convoluted path.

56. A knotter having therein strand guiding means, knot tying means, and strand severing means, said strand severing means being constructed and arranged to cut a plurality of strands in succession.

57. In a knot tying device, in combination a movable yarn cutting blade and means associated with said blade whereby said blade may be brought by a continuous movement successively into contact with each of a plurality of yarns.

58. A knotter having therein a pivotally mounted cutter blade, and means associated with said blade whereby a plurality of yarns may be supported for successive severance during a single oscillation of the blade about its pivot.

59. In a strand manipulating device, in combination, means for positioning a length of strand, a device for gripping a strand, and means for bodily moving said gripping device in a curved path enclosing a length of strand positioned by said first named means.

60. In a yarn tying mechanism, in combination, means for supporting a bight of yarn, a yarn carrier having a yarn engaging element, and means for bodily moving said carrier in a substantially spiral path about a bight of yarn held in said supporting means.

61. In a device of the class described, in combination spaced supports for a strand, a carrier member bodily movable in a curved path intermediate said supports, said carrier having strand engaging means, and means for moving said carrier in a volute path whereby to pass the end of a strand held in said notch completely around a length of strand extending between said supports.

62. In a mechanism of the class described, in combination a guide and a yarn carrier movable therealong, said guide comprising a substantially semi-circular portion separated from adjacent portions thereof by aligned slots.

63. A knotter having therein a curved guide providing a channel and a yarn carrier movable in said channel, said guide comprising portions of relative large and other portions of relative small radius of curvature.

64. A knotter having therein means for positioning a pair of strands, means for cutting one of said strands, and means for gripping the severed end of said strand and passing it about the other of said strands in the convolutions of a knot, said cutting means being constructed and arranged to sever said other strand.

65. In combination in a knot tying mechanism, means for positioning a plurality of strands, cutting means for severing one of said strands, gripper means for engaging the severed end of such strand, and means for moving said gripping means bodily about another of said strands whereby to carry said severed end about the same, said cutting means being constructed and arranged to act subsequently to the said motions to sever said last named strand.

66. In a device of the class described, in combination guides for positioning a pair of yarns, said guides being constructed and arranged to cause one of said yarns to cross a bight of said other yarn, a cutter blade movable transversely across said yarns whereby first to sever one and then the other respectively, bodily movable means for moving the severed end of said first yarn about said other yarn prior to the severance of the latter, and discontinuous driving means for said bodily movable means.

67. In a knotter, the combination of a strand carrier movable in a fixed path with strand guides adapted to lead a strand or strands into position to be seized and carried in said path by said carrier.

68. A knotter having therein a severing device and strand guides in normally fixed relation, having portions adapted to lead strands into co-operative relation with the severing device, a carrier adapted to seize an end of a strand severed by operation of the severing device, and a guide determining the path of motion of the carrier.

69. A knotter having therein a tying device and strand guides for severally leading each of a plurality of strands in different paths, and a single severing device adapted to sever strands positioned by entrance into said guides in a predetermined order.

70. A knotter having therein in combination, a severing device for successively severing strands differently positioned thereat, in combination with strand guides adapted to lead strands entered thereat severally to said positions, a tying device, and means forming part of said guiding devices for positioning the strands in relation thereto.

71. A knotter having therein a tying device operating in a fixed path, strand guides adapted to position severally two or more strands entered thereat in relation to said path, severing means for one of the strands, and means traveling in said path for positioning the strand so severed for engagement and carriage in the convolutions of a knot about another or other strands positioned by said strand guides.

72. A knotter having strand guides adapted and arranged to position mutually a plurality of strands in relation to tying means, tying means adapted to form a knot by operation on one of the strands, and take-up means for setting up the formed knot.

73. A knotter having therein a strand guide and tying means, the strand guide comprising mutually cooperating members, one of said members having guiding parts operative to position the yarn guided thereby at each side of the tying means, said member being movable away from co-relation with the other member.

74. A strand guide for knotters comprising mutually cooperative members adapted severally to lead the strands entered thereat to predetermined relation, one of the members being movable away from the other.

75. A strand guide for knotters comprising mutually cooperative members adapted severally to lead the strands entered thereat to predetermined relation, one of the members being movable away from the other, and a clamp for one of the strands carried by said movable member.

76. A knotter having therein, in combination, a strand guide for severally positioning a plurality of yarns, one member of said guide being movable, and means on said movable member for clamping a strand, whereby to permit movement of said member to set up a formed knot.

77. A device for manipulating strands having therein a strand engaging element, means for moving said element through a path comprising a substantially circular arc, a strand guide for supporting a strand at a point adjacent the center of said arc, means for positioning said strand at points at either side of said guide, other guides for a second strand, said latter guides being constructed and arranged whereby to cause a strand moving in contact therewith to engage said first strand at a point between said first named guide and one of said positioning means.

78. In a knot-tying device, a strand carrier, a substantially spiral guide for said carrier, said guide having aligned gaps intersecting its coils at a plurality of points, and strand guide means constructed and arranged to move a strand transversely across said first named guide through a plurality of said gaps.

79. A knotter having therein a strand carrier, a convoluted guide therefor, said guide having aligned gaps intersecting its coils at a plurality of points, and strand guide means associated with said carrier guide and constructed and arranged to cause a strand passing in contact therewith to pass transversely through two of said gaps.

80. A knotter having therein strand-guiding devices including a separator for strands or groups of strands entered thereat, the strand-guiding devices having resting points for the several strands causing them to define a predetermined position in relation to each other, in combination with a tying device having therein a member moving in a fixed path intersecting one of said positions and surrounding another of said positions.

81. A knotter having therein a strand-guide comprising a movable take-up arm, and means tending to move the take-up arm, means for restraining this motion, and means for releasing the take-up arm at the conclusion of a knot-tying operation.

82. A knotter having therein tying means, a spring actuated take-up including yarn-holding means, and means operative to retain said take-up in inactive condition in opposition to the action of its spring through a predetermined part of a tying operation.

83. A knotter having therein tying means, a take-up device, spring means tending to move said device for setting up a knot, a latch for restraining said device against movement, and means operable in time with said tying means for releasing said latch whereby to permit actuation of the take-up device.

84. A knotter having therein tying means, a frame, a take-up arm pivoted to swing upon said frame, spring means for swinging said device in one direction, and positively actuated means for moving to and retaining said device at one extreme of its motion in the other direction, in combination with means on the take-up arm adapted to cooperate with fixed parts to guide a strand to the tying means.

85. A knotter having therein a take-up arm, a yarn clamping implement slidably supported by said take-up arm, a cam member fixed relatively to said arm, and means interposed between said cam member and said implement whereby movement of said arm serves to actuate said implement.

86. In mechanism of the class described, in combination, knot set-up means comprising a pivoted take-up arm, a slide member guided for movement in said arm and having a thread engaging hook, means for transmitting motion to the slide mounted upon said lever, a cam element fixed relatively to said lever, said transmitting means having a follower contacting with said cam element.

87. A knotter having therein a pivoted take-up arm having a guide thereon, a slide member movable along said guide and having a thread-clamp element, and means operable to swing said lever, to retract said slide member, to clamp the yarn and thereafter to open the clamp at a predetermined point in its swing.

88. In combination in a knot-tying implement, a frame, a shaft carried thereby, a take-up device pivotally mounted upon the frame, spring means tending movably to swing said take-up through its arc of operation, a latch for retaining said device in opposition to said spring means, and means movable with said shaft constructed and arranged to release said latch at a predetermined point in the motion of the shaft.

89. A knotter having therein a movable carrier constructed and arranged to carry a yarn end in the convolutions of a knot, take-up means including a yarn clamp, and devices operable to permit the sudden actuation of said take-up means at a predetermined point of the motion of the carrier.

90. In a knot tying device, in combination, non-rotative yarn manipulating instrumentalities including a carrier movable in a curved path, a single drive shaft, means associated with said shaft for determining the operation of said instrumentalities, and manually actuable means for turning said shaft.

91. A knotter having therein yarn-end carrying means, yarn severing means, and take-up means, a drive shaft, devices movable in time with said shaft for actuating said means, and a manually operable element whereby said shaft may be actuated.

92. A knotter having therein a yarn carrier, strand guiding means having therein a separator plate presenting opposed faces for guiding the respective strands of a pair, means for moving said carrier in a knot forming path, and means cooperating with said separator plates for positioning the respective yarns in relation to the knot-forming path, one of the yarns being positioned to be engaged by the carrier, and the other retained in a stationary position.

93. Strand-manipulating means having therein a channeled guide, and a carrier for a yarn end movable in the channel, and adapted thereby to retain the yarn end by friction between the carrier and the walls of the channel.

94. A knotter having therein tying means adapted to tie one type of knot, such as a weaver's knot, and having parts arranged to receive adjunctive devices attachable to the tying means for tying another type of knot, such as a spooler's knot.

Signed by me at Boston, Massachusetts, this tenth day of August 1920.

ROBERT W. BARKER.